Dec. 16, 1952 — R. G. SHEIDLER — 2,622,181
ELECTRICAL HEATING ELEMENT FOR COOKING RANGE OVENS
Filed Feb. 27, 1950 — 3 Sheets-Sheet 1

INVENTOR.
Robert G. Sheidler
BY Chas. H. Trotter
Atty.

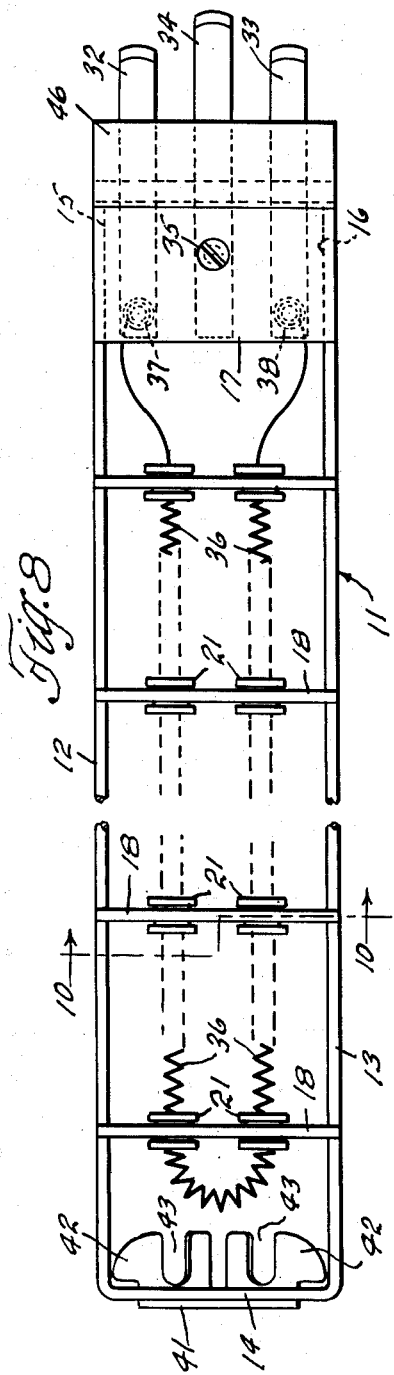

Dec. 16, 1952 R. G. SHEIDLER 2,622,181
ELECTRICAL HEATING ELEMENT FOR COOKING RANGE OVENS
Filed Feb. 27, 1950 3 Sheets-Sheet 3
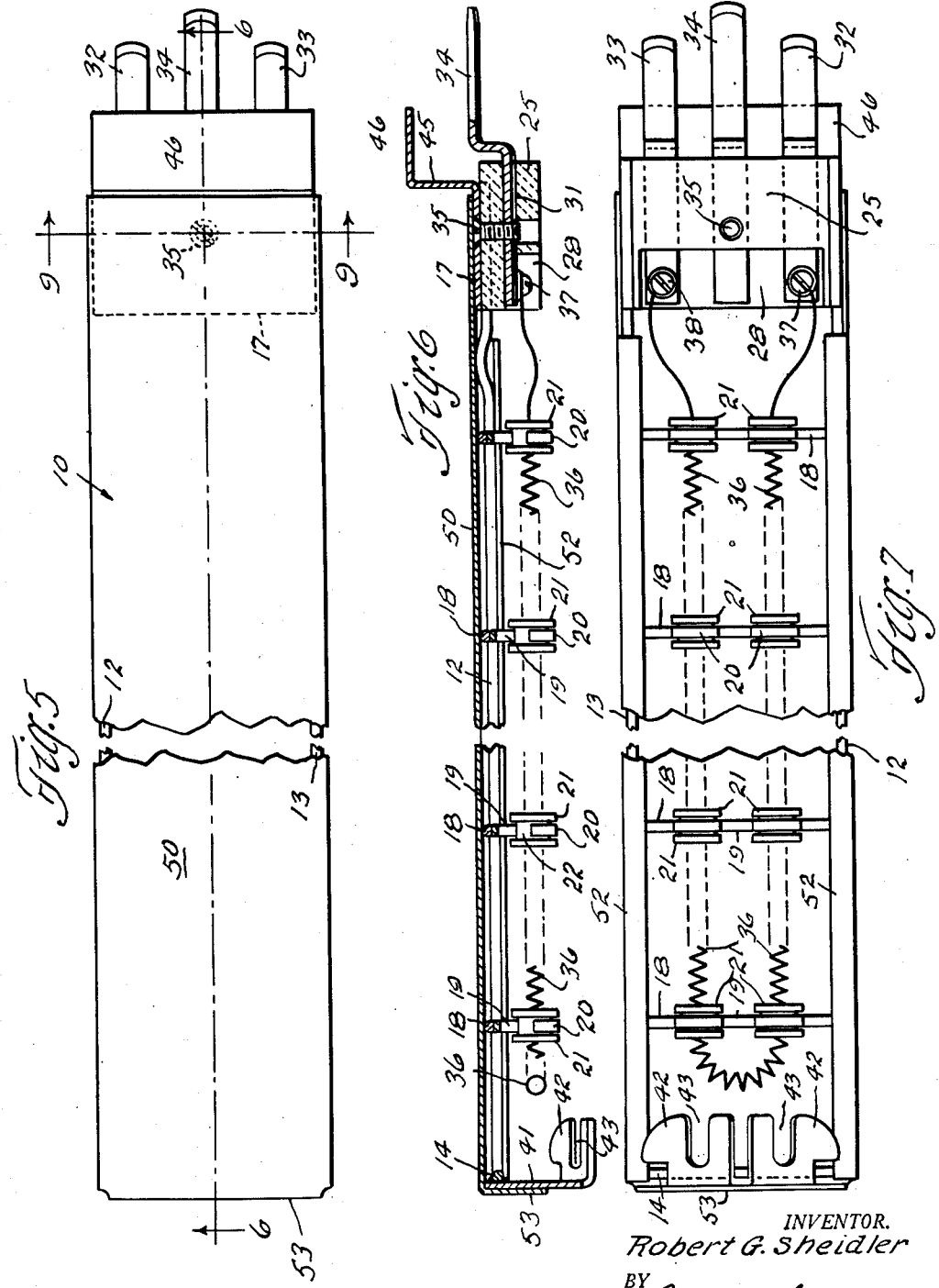
INVENTOR.
Robert G. Sheidler
BY Chas. H. Trotter
Atty.

Patented Dec. 16, 1952

2,622,181

UNITED STATES PATENT OFFICE 2,622,181

ELECTRICAL HEATING ELEMENT FOR COOKING RANGE OVENS

Robert G. Sheidler, Mansfield, Ohio, assignor to The Tappan Stove Company, Mansfield, Ohio, a corporation of Ohio Application February 27, 1950, Serial No. 146,454

2 Claims. (Cl. 219—19)

This invention relates generally to electrical resistance heating elements. It is especially designed and adapted for use in the ovens of cooking ranges.

The principal object of the invention is to provide an electrical heating element which is adapted to be mounted adjacent the side walls of an oven in the lower corners thereof in such a manner as to create, when in use, a continuous circulation of two distinct currents of heated air in such a manner as to produce improved baking results.

Another object of the invention is to provide a heating element of this type which is so constructed and arranged that it may be quickly and easily installed in an oven and removed therefrom as a single unit in order to facilitate the cleaning and polishing of the oven after use.

Another object of the invention is to provide an electrical heating element of this character which comprises a suitably supported resistance coil and a removable cover plate which directs the heated air in the desired path and at the same time protects the resistance coil from spillage or overflow of anything in the oven.

Still another object of the invention is to provide a heating element of this character which is of simple construction, is very efficient in operation, and can be easily manufactured at low cost.

Other and more limited objects of the invention will be apparent from the following specification and the accompanying drawings forming a part thereof in which:

Fig. 4 is an enlarged vertical section taken on the line 4—4 of Fig. 2;

Fig. 5 is a top plan view, on the same scale as Figs. 3 and 4, of the heating element removed from the oven;

Fig. 6 is a central longitudinal section taken on the line 6—6 of Fig. 5;

Fig. 7 is a bottom plan view of the heating element as shown in Figs. 5 and 6;

Fig. 8 is a top plan view of the element with the cover plate removed therefrom;

Fig. 9 is a transverse section taken on the line 9—9 of Fig. 5; and

Fig. 10 is an enlarged transverse section taken on the line 10—10 of Fig. 8.

Figure 1:
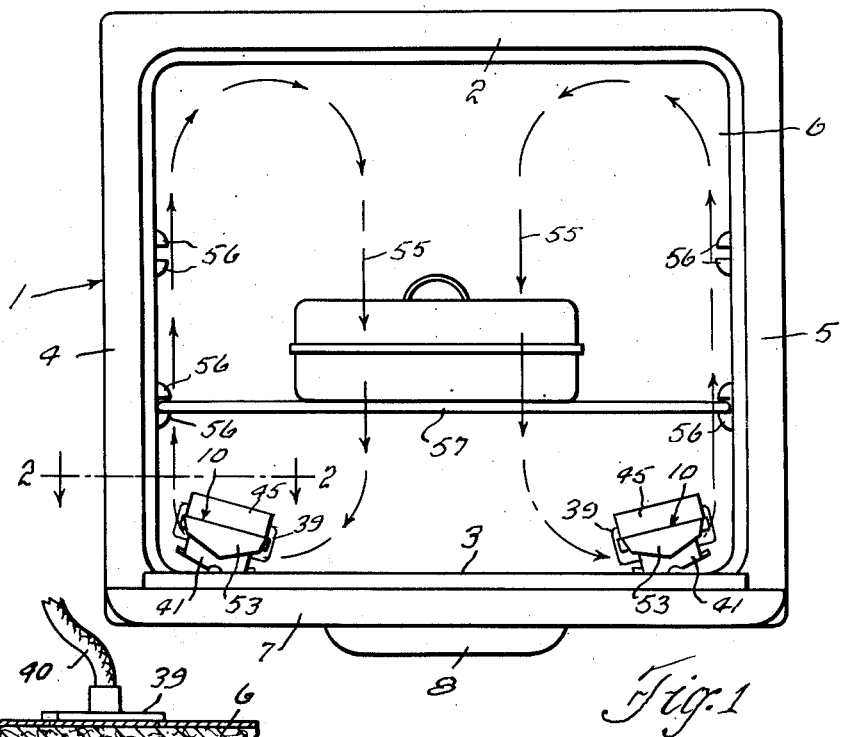
Fig. 1 is a front elevation of a cooking range oven with the oven door in open position, and showing a pair of my improved heating elements mounted therein.
Figure 2:
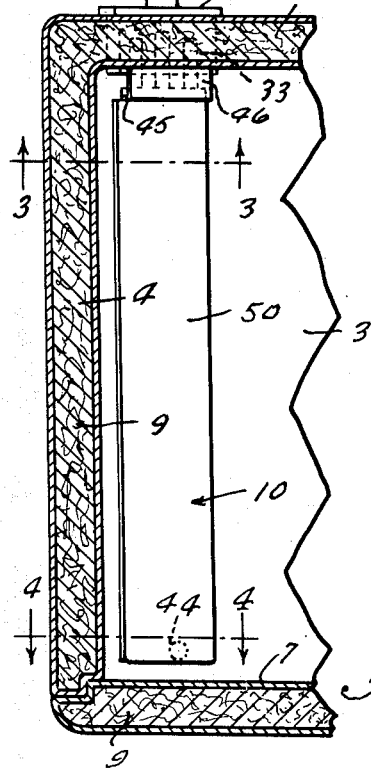
Fig. 2 is a horizontal section taken on the line 2—2 of Fig. 1, with the oven door in closed position.
Figure 3:
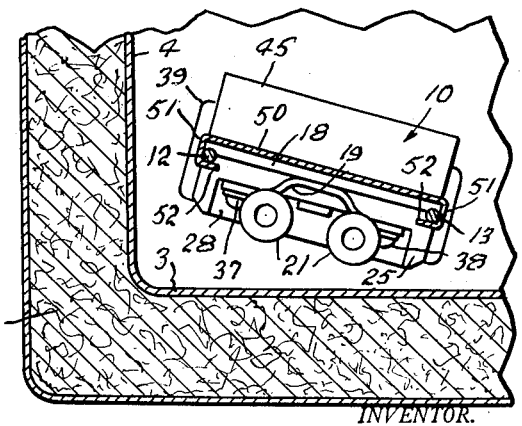
Fig. 3 is an enlarged vertical section taken on the line 3—3 of Fig. 2.

Referring now to the drawings, which illustrate the preferred embodiment of my invention, the numeral 1 indicates generally a cooking range oven having top and bottom walls 2 and 3, side walls 4 and 5 and a rear wall 6. The front of the oven is closed by a door 7 which is pivotally secured in place in any suitable manner and is adapted to be opened and closed through the medium of a handle 8. As shown herein, the oven walls and the door are suitably insulated as indicated at 9.

Removably secured within the oven, one adjacent each lower corner thereof and extending substantially the full length of the oven from the front to the rear thereof, are a pair of electrical resistance heating elements generally indicated by the numeral 10.

The element 10 includes an elongated U-shaped frame 11 formed from a single length of metal rod, and comprising the spaced parallel arms 12 and 13 and the connecting base 14. The ends 15 and 16 of the arms 12 and 13 are spot welded to the under side of a transverse metal plate 17 which extends between the arms 12 and 13 opposite the base 14. A plurality of cross bars 18 are welded to the arms 12 and 13 at equally spaced intervals between the base 14 and the plate 17.

A strap 19 is welded to the underside of each of the cross bars 18, midway between the arms 12 and 13. The ends of the straps 19 extend downwardly and outwardly from the cross bars 18 and terminate in two rows of spaced aligned loops 20. An insulating spool 21 having a peripheral groove 22 is mounted in each of the loops 20, the loop 20 engaging the spool 21 in the groove 22. Each spool 21 has a centrally disposed transverse aperture 23 therethrough.

An electrical terminal plug 25 of insulating material, preferably porcelain, is secured to the underside of the plate 17 between the arms 12 and 13. The upper side corners of the plug 25 are cut out as indicated at 26 and 27 for the reception of the ends 15 and 16 of the arms 12 and 13. The under side of the plug at the rear end thereof is notched out as indicated at 28. Extending between the notched out portion 28 and the forward end of the plug are three spaced rectangular apertures 29, 30 and 31 in which are mounted connector prongs 32, 33 and 34, the rear ends of which are disposed within the notched out portion 28 of the plug 25. The plug 25 is removably secured to the plate 17 by a screw 35 which extends down through the plate 17 and into a threaded aperture in the prong 34 as shown in Figs. 6 and 9. An electrical resistance coil 36 having the ends thereof connected to the prongs 32 and 33, as indicated at 37 and 38, is threaded through and supported by the spools 21. The prongs 32, 33 and 34 are adapted to enter suitable electrical sockets 39 which are permanently mounted in the rear wall 6 of the oven 1. The prongs 32 and 33 form an electrical connection, within a socket 39, between the resistance coil 36 and the line 40. The prong 34 is provided for grounding the element.

The prongs 32, 33 and 34 and the socket 39 support and maintain the inner end of the element 10 in proper position within the oven. In order to properly support the forward end of the element in place I weld a leg 41 to the base 14 of the frame 11. The leg 41 extends downwardly from the end section 14 and terminates in a pair of rearwardly extending tabs 42. The tabs 42 are slotted as indicated at 43 and are disposed at an obtuse angle to each other as shown. In use one of the slotted tabs 42 lies flat against the oven bottom 3 and engages under a button 44 permanently secured to the oven bottom. By arranging the tabs 42 in the manner shown, with respect to each other, it is possible to use the same element 10 in either corner of the oven, thus avoiding the necessity of providing right and left hand elements. The plate 17 is preferably extended upwardly and then rearwardly over the prongs 32, 33 and 34 as indicated at 45 and 46. The extension 46 of the plate 17 acts as a protecting shield for the prongs 32, 33 and 34 and by engaging the rear wall 6 of the oven assists in properly positioning the element in place.

In order to properly direct the heated currents of air and to protect the resistance coil 36 from spillage I provide a removable cover plate 50 which is disposed over the frame 11 and the lower portion of the plate 17. The side edges of the plate 50 are turned downwardly as indicated at 51 and then inwardly to provide a pair of spaced flanges parallel to the under side of the plate. The under side of the plate 50 rests on the tops of the cross bars 18 and the plate 17, and the flanges 52 engage under the arms 12 and 13 of the frame 11. The forward end 53 of the plate 50 is turned downwardly to engage the leg 41 when in position. The plate 50 may be removed by sliding it forwardly from the frame 11.

As previously stated, a heating element 10 is adapted to be secured in each lower corner of an oven and to extend substantially the full length of the oven from the front to the rear thereof. Each element is held in proper position by the prongs 32, 33 and 34, which engage one of the electric sockets 39 mounted in the rear wall 6, and by one of the buttons 44 secured to the oven bottom 3 adjacent the door 7, which engages one of the slotted tabs 42 of the leg 41. The sockets 39 are so positioned in the rear wall 6 and the leg 41 and tabs 42 so proportioned that the elements will be maintained at the desired angle with respect to the bottom and side walls of the oven, and with the edges of the plates 50 spaced the desired distance from the bottom and side walls. The construction and arrangement of a heating element 10 with respect to the bottom wall and one of the side walls of the oven is such as to provide a horizontal passageway between the bottom wall of the oven and one side edge of the plate 50, and a vertical passageway between a side wall of the oven and the other side edge of the plate 50. When the resistance coils 36 are energized the air within the oven will continuously circulate along the paths indicated by the arrows 55 in Fig. 1, flowing in through the horizontal passageways, then past and around the resistance coils where it is heated and then up and out through the vertical passageways.

The energization of the resistance coils 36 is controlled by a suitable switch (not shown) of standard construction which is mounted in a convenient place upon the range. Bosses 56 on the side walls 4 and 5 of the oven are provided for slidably supporting on oven rack 57.

In order to remove the heating elements 10 for cleaning and to facilitate the cleaning and polishing of the oven lining it is only necessary to gently pull the elements forwardly a short distance which disengages the tabs 42 and the buttons 44 and withdraws the prongs 32, 33 and 34 from the socket 39. The elements can then be lifted out of the oven. In replacing an element it is first laid on the bottom of the oven with the prongs 32, 33 and 34 in position to enter a socket 39, and then pushed rearwardly until the prongs 32, 33 and 34 fully enter the socket 39 and the tab 42 engage a button 44.

From the foregoing it will be apparent to those skilled in this art that I have provided a very simple and efficient mechanism for accomplishing the objects of my invention. It is to be understood that I am not limited to the specific construction shown and described herein as various modification can be made therein within the spirit of the invention.

What is claimed is:

1. In an electrical heating element adapted to be removably secured in the oven of a cooking range adjacent a lower corner thereof, the combination of a U-shaped frame formed from a single piece of metal rod and comprising a pair of spaced parallel arms and a connecting base, a plate secured to the free ends of said arms, a plurality of spaced parallel transverse cross bars connected to said arms between said base and said plate, a pair of spaced insulation spools carried by each of said cross bars below said frame, a plug secured to the underside of said plate, a pair of connector prongs carried by said plug, an electrical resistance coil threaded through said spools and having its ends connected to said prongs, a supporting leg secured to and extending downwardly from said base, a securing tab fastened to the free end of said leg, a cover plate disposed over said frame, and interengaging means between said frame and said cover plate by which said cover plate is removably secured to said frame.

2. In an electrical heating element adapted to be removably secured in the oven of a cooking range adjacent a lower corner thereof, the combination of a U-shaped frame formed from a single piece of metal rod and comprising a pair of spaced parallel arms and a connecting base, a plate secured to the free ends of said arms, a plurality of spaced parallel transverse cross bars connected to said arms between said base and said plate, a pair of spaced insulation spools carried by each of said cross bars below said frame, a plug secured to the underside of said plate, a pair of connector prongs carried by said plug, an electrical resistance coil threaded through said spools and having its ends connected to said prongs, a supporting leg secured to and extending downwardly from said base, a pair of securing tabs disposed at an angle to each other and fastened to the free end of said leg, a cover plate disposed over said frame, and interchanging means between said frame and said cover plate by which said cover plate is removably secured to said frame.

ROBERT G. SHEIDLER.

REFERENCES CITED

The following references are of record in the file of this patent:

UNITED STATES PATENTS

| Number | Name | Date |
|---|---|---|
| 1,001,637 | Gray | Aug. 29, 1911 |
| 1,736,451 | MacInnes | Nov. 19, 1929 |
| 2,096,663 | Woodley | Oct. 19, 1937 |
| 2,316,222 | Butters | Apr. 13, 1943 |
| 2,494,903 | Sheidler | Jan. 17, 1950 |

FOREIGN PATENTS

| Number | Country | Date |
|---|---|---|
| 603,656 | Great Britain | June 21, 1948 |